United States Patent

[11] 3,581,550

| [72] | Inventor | Daniel E. Waterbury<br>Saline, Mich. |
|---|---|---|
| [21] | Appl. No. | 769,626 |
| [22] | Filed | Oct. 22, 1968 |
| [45] | Patented | June 1, 1971 |
| [73] | Assignee | Kelsey-Hayes Company |

[54] WHEEL ROUNDING MACHINE
5 Claims, 2 Drawing Figs.

[52] U.S. Cl. ............................................. 72/402,
72/334, 29/159.1, 29/159.3
[51] Int. Cl. ............................................. B21d 41/00
[50] Field of Search............................................. 72/401,
402, 355, 354, 353, 352, 334; 29/159.1, 159.3,
159.01, 159.03, 159

[56] References Cited
UNITED STATES PATENTS
2,659,407  11/1953  Kay ............................ 72/401

| 1,007,941 | 11/1911 | Hansen........................ | 72/354 |
| 2,586,029 | 2/1952 | Greenshields............... | 72/399 |
| 2,826,161 | 3/1958 | Palmer........................ | 72/354 |

*Primary Examiner*—Richard J. Herbst
*Assistant Examiner*—Michael J. Keenan
*Attorney*—Harness, Dickey & Pierce

ABSTRACT: A machine for rounding assembled wheels and for accurately forming and aligning a locating hole in the wheel spider with relation to the rim. The machine includes a plurality of radially movable rounding dies for engagement with the rim of the assembled wheel for rounding the rim. In addition, a forming tool in the form of a rotating cutter is provided for forming and aligning a locating opening in the wheel spider. The forming tool is supported by aligning means that are engageable with the rounding dies when the rounding dies are in their rounding position for accurately locating the forming tool with respect to these rounding dies.

INVENTOR.
Daniel E. Waterbury
BY
Harness, Dickey & Pierce
ATTORNEYS.

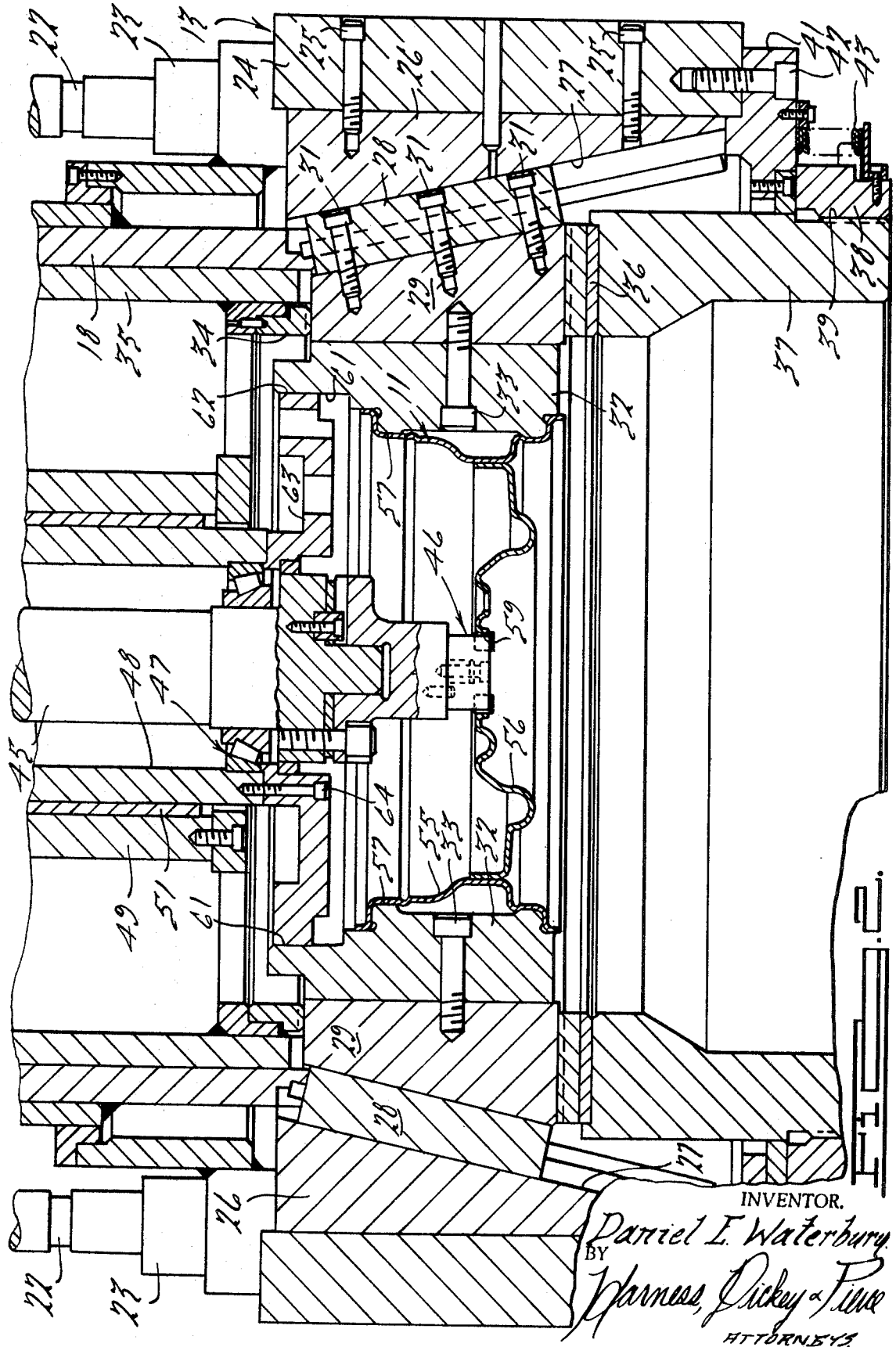

3,581,550

WHEEL ROUNDING MACHINE

BACKGROUND OF THE INVENTION

This invention relates generally to a wheel-rounding machine and more particularly to a machine for rounding assembled wheels and for accurately forming and aligning a locating opening in the wheel center of the assembled wheel with respect to the rounded rim.

In the copending Pat. application of Horace D. Gregg, Ser. No. 673,424, filed May 10, 1967, entitled "Wheel Rounding Machine" and assigned to the assignee of this invention, there is disclosed a machine for rounding assembled vehicular wheels. As is noted in that copending application, it is essential to insure perfect roundness of the wheel rim and accurate alignment of the rim with respect to the associated wheel center and particularly with respect to the axis of rotation of the wheel. The machine disclosed in that application includes rounding dies that engage the rim of the wheel for rounding the rim and forming tools for accurately locating and forming openings in the wheel center which openings determine the axis of rotation of the wheel.

Although the machine disclosed in the aforenoted copending application represents a considerable step forward in this art, the continuing demands of vehicle manufacturers for accuracy has created a necessity for even further accuracy in the wheel making art. True roundness of the wheel rim, although highly desirable, is ineffectual unless the axis of the rim coincides exactly with the axis of rotation of the wheel. As was noted in the aforementioned copending application, the axis of rotation of the wheel is defined either by a central hub opening in the wheel center that coacts with an associated portion of the vehicle or by attachment bolt holes accurately located within the wheel center. Although the machine described in that application is intended to accurately form and locate these holes, the hole-forming and -locating apparatus is carried by an upper ram that is supported for movement relative to the wheel rounding dies that coact with the rim. A buildup of tolerances in the respective components could, therefor, cause misalignment.

It is, therefore, a principal object of this invention to provide a wheel rounding machine including a forming apparatus for accurately forming and aligning locating holes in the wheel center relative to the rounded rim.

It is another object of this invention to provide a wheel rounding machine wherein the forming tool for the locating opening is accurately guided.

It is a further object of this invention to provide a wheel rounding machine wherein the forming tool is guided by the rounding dies.

SUMMARY OF THE INVENTION

A machine embodying this invention is particularly adapted for rounding assembled wheels having a wheel center and a rim and for insuring an accurately aligned relationship between the rim and at least one opening in the wheel center which opening serves to locate the assembled wheel with respect to an associated vehicle. Such a wheel rounding machine includes a plurality of rounding dies and means for supporting the rounding dies for movement with respect to an associated wheel. The rounding dies are movable by means of actuating means from a retracted position wherein an assembled wheel may be juxtaposed to the rounding dies to a wheel rounding position wherein the rounding dies are adapted to engage and perform a rounding operation upon the rim of the associated wheel. Forming tool means are provided for sizing and locating at least the one opening in the wheel center of the associated wheel. Aligning means support the forming tool means and are engageable with the rounding dies when the rounding dies are in their wheel rounding position for accurately aligning the forming tool means relative to the rounding dies and to the rounded wheel rim.

BRIEF DESCRIPTION OF THE DRAWINGS

FIG. 2 is an enlarged cross-sectional view of the wheel rounding and forming machine, showing the machine in its rounding and forming position.

DETAILED DESCRIPTION OF THE PREFERRED EMBODIMENT

Figure 1:
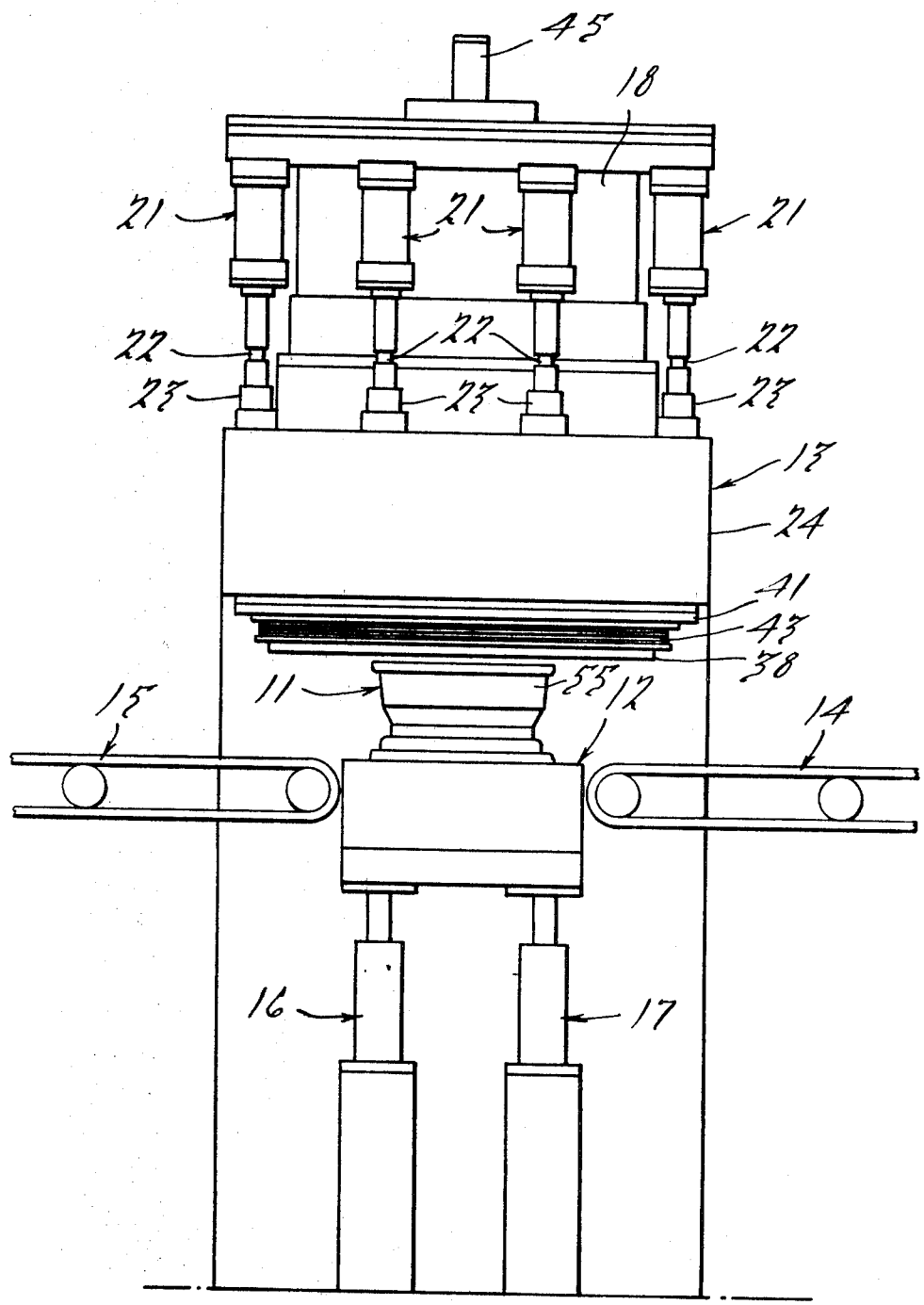
FIG. 1 is a side elevational view of an apparatus embodying this invention and particularly adapted for rounding and forming vehicular wheels.

Referring first to FIG. 1, an apparatus is illustrated for performing a rounding operation and associated forming operation upon an assembled vehicular wheel, indicated generally by the reference numeral 11. The machine comprises a table 12 that is adapted to support the wheel 11 to be formed and an overlying rounding and forming machine 13. Assembled wheels are delivered to the table 12 from an associated wheel assembling machine (not shown) by means of a feed conveyor 14. The rounded and formed wheels 11 are conveyed from the table 12 by means of a discharge conveyor 15.

The feed conveyor 14 and discharge conveyor 15 are driven sequentially in any known manner so as to present wheels 11 in a step-by-step manner to the table 12. The wheel rounding and forming machine 13 is positioned above the table 12 at a sufficient distance so that the wheels 11 may be presented to the table 12 without interference. When assembled wheel 11 is placed upon the table 12, the wheel 11 is raised into a cavity, to be described, in the wheel rounding and forming machine 13 by means of hydraulic cylinders 16 and 17 or the like.

Referring now additionally to FIG. 2, the wheel rounding and forming machine 13 includes a base assembly that is mounted in any suitable manner in a fixed position above the table 12. The machine 13 is shown in its wheel rounding and forming position in FIG. 2 and the table 12 has been eliminated to more clearly show the construction. The base assembly of the machine 13 includes a fixed sleeve 18 around which a plurality of hydraulic cylinder assemblies 21 are provided. The hydraulic cylinder assemblies 21 include piston rods 22 that are connected in any suitable manner, for example by way of threaded adapters 23, to an outer ring 24. The outer ring 24 is fixed by means of socket-headed screws 25 to a plurality of circumferentially spaced wedge blocks 26. The wedge blocks define T-shaped grooves 27 in which a cooperating jaw retainer 28 is slidably supported. Each jaw retainer 28 is affixed to a respective jaw 29 as by socket-headed screws 31. Wheel rounding dies 32 are affixed to each of the jaws 29 by socket-headed screws 33.

The jaws 29 are supported for substantially radial movement between an inner bushing 34 which is carried in any suitable manner by a fixed inner sleeve 35 of the machine 13 and a lower jaw liner 36. The lower jaw liner 36 is affixed in any suitable manner to a lower ring 37. The lower ring 37 is carried by the sleeve 18 by means of a plurality of socket-headed bolts (not shown) that connect the ring 37 to spacers (not shown) that extend between adjacent of the jaws 29. These spacers are, in turn, affixed in any suitable manner to the sleeve 18.

An adjustable stop ring 38 is threaded onto an externally threaded portion 39 formed at the lower end of the ring 37. The stop ring 38 is adapted to be engaged by an outside bushing 41 that is fixed to the outer ring 24 by socket headed bolts 42 to limit the extreme downward movement of the outer ring 24. A flexible bellows 43 is fixed between the bushing 41 and stop ring 38 for precluding the ingress of dirt and other foreign materials to the respective sliding surfaces.

A driven spindle 45 extends through the center of the machine 13 and carries a cutting tool 46 at its lower end. The spindle 45 and associated cutting tool 46 are supported at one end by an antifriction bearing 47 that is carried within and fixed to an inner sleeve 48. The inner sleeve 48 is mounted for reciprocatory movement along with the spindle 45 and cutting tool 46 and is loosely guided within a fixed sleeve 49 by means of a bushing 51.

OPERATION

In operation, wheels 11 are sequentially presented to the table 12 by the feed conveyor 14. The wheels 11 comprise a rim portion 55 and a spider portion 56 (FIG. 2) that is affixed to the rim portion 55 in any known manner. Preferably, the rim portion 55 is slightly oversize when the wheel 11 is made. That is, the diameter of the tire beads of the rim 15 is slightly larger than the desired finished diameter.

When a wheel 11 is present on the table 12, the table 12 is elevated by actuation of the cylinders 16 and 17. At this time, the rounding dies 32 will be in their retracted position, a position opposite to that shown in FIG. 2. At this time, the outer ring 24 will be retracted from the position shown in FIG. 2 and the jaw retainers 28 will be at the lower end of the T-grooves 27. When the wheel 11 is presented between the open wheel rounding dies 32, the cylinder assemblies 21 are actuated driving the piston rods 22 downwardly. This downward movement is transmitted to the outer sleeve 24 and wedges 26. Since the jaw retainers 28 and jaws 29 are held against any axial movement, these elements are cammed in a radially inward direction. The rounding dies 32 are formed with surfaces 57 that engage the outer portion of the rim 55 as the dies 32 move inwardly. The surfaces 57 are accurately formed and are designed so as to reduce the diameter of the rim 55 sufficiently so that, allowing for springback, the rim 55 will be perfectly rounded both axially and radially. When the dies 32 are in their closed or wheel rounding position, their surfaces 57 extend substantially continuously around the periphery of the rim 55.

When the wheel 11 is held in its rounded position, the cutting tool 46 is presented to a hub opening 59 formed centrally in the spider 56. This movement is effected by reciprocation of the sleeve 48 and spindle 45. The cutting tool 46 is then presented to the hub opening 59, which heretofore was undersize, to perform a final machining operation upon this opening. In order to insure complete concentricity between the rim 55 and hub opening 59, the spindle 45 and cutting tool 46 are guided directly upon guide surfaces 61 formed at the upper end of the rounding dies 32. The guide surfaces 61 are formed accurately with respect to the surfaces 57 to insure concentricity. The guide surfaces 61 are engaged by a pilot surface 62 of an aligning pilot member 63 that is rigidly affixed, as by socket headed screws 64, to the sleeve 48. Any misalignment in the machine between the axis of the spindle 45 and the remaining components will have no effect on the accuracy of the finished wheel since the cutting tool 46 is accurately aligned with the rounded rim 55. It should be noted that the extent of the surfaces 61 on the rounding dies 32 is greater than the axial movement of the spindle 45 and cutting tool 46. That is, the surface 62 of the pilot member 63 is always disposed radially inwardly of the rounding die surface 61 regardless of whether the machine is in its retracted or extended positions. Hence, the cutting tool 46 will be accurately aligned before it enters the hub opening 59.

After the hub opening 59 has been machined, the cutting tool 46 is retracted and subsequently the rounding dies 32 are retracted by withdrawal of the outer sleeve 24. The table 12 is then dropped by suitable operation of the cylinders 16 and 17 and the rounded wheel is removed by the conveyor 15 as the next wheel to be rounded is presented to the table 12.

It should be noted that the rounded wheels will be true both axially and radially with respect to the locating opening in the spider, which opening is machined when the rounding dies are in their closed position. The cutting tool, which is described and illustrated as being a rotating-type cutter but which, of course, could be of other types, is accurately guided by the rounding dies. It should be understood that, although the invention has been described in connection with a wheel that has its axis of rotation defined by a central hub opening, the invention may be used in conjunction with wheels that have their axis of rotation determined in other manners. For example, a gang drill arrangement might be guided in a similar manner for drilling the bolt receiving openings in the spider. In addition, although the machine has been described in connection with a wheel having a spider, it can be used with wheels having other types of wheel centers such as disc or spoked wheels. Other modifications within the scope of the invention will present themselves to those skilled in the art.

What I claim is:

1. A machine for rounding assembled wheels having a wheel center and a rum and for assuring an accurately aligned relationship between the rim and at least one opening in the wheel center which opening serves to locate the assembled wheel with respect to an associated vehicle, said machine comprising a plurality of rounding dies, means for supporting said rounding dies for movement with respect to an associated wheel, actuating means for moving said rounding dies from a retracted position wherein an assembled wheel may be juxtaposed to said rounding dies to a wheel rounding position wherein said rounding dies are adapted to engage and perform a rounding operation upon the rim of the associated wheel, forming tool means for sizing and locating at least one opening in the wheel center of the associated wheel, and aligning means for supporting said forming tool means, said aligning means being engageable with said rounding dies when said rounding dies are in their wheel rounding positions for accurately aligning said forming tool means relative to said rounding dies and to the rounded wheel rim.

2. A machine as set forth in claim 1 wherein the rounding die means have guide surfaces engageable with the aligning means for aligning said tool means relative to the rounding die means.

3. A machine as set forth in claim 2 wherein the forming tool is a rotating cutter.

4. A machine as set forth in claim 2 wherein the aligning means comprises a collar supporting the forming tool means, the wheel rounding dies having means defining a cylindrical surface in engagement with a cooperating surface of said collar when said wheel rounding dies are in their wheel rounding position.

5. A machine as set forth in claim 4 further including cam means for driving the wheel rounding dies between their retracted and wheel rounding positions.